Patented May 26, 1936

2,041,820

UNITED STATES PATENT OFFICE 2,041,820

PRODUCTION OF ESTERS

John William Croom Crawford, Ardrossan, Scotland, assignor to Imperial Chemical Industries Limited, a corporation of Great Britain No Drawing. Application May 5, 1934, Serial No. 724,207. In Great Britain May 13, 1933

9 Claims. (Cl. 260—106)

This invention relates to the production of alpha-hydroxy fatty acid esters from ketonic cyanohydrins, sulfuric acid, and the appropriate alcohol. In my copending application Ser. No. 684,749 there are described methods whereby esters of methacrylic acid are obtained by means of reactions carried out with acetone cyanohydrin, sulfuric acid, and an alcohol, and the present invention relates in part to a modification of that process.

When the product of reaction between a ketone cyanohydrin, for instance acetone cyanohydrin, and sulfuric acid is heated with an alcohol, and the heated mixture is distilled, it is found that both the alpha-hydroxy ester and the corresponding unsaturated ester derivable therefrom by dehydration are formed. In the cited instance these compounds would be respectively an alpha-hydroxy-iso-butyric ester and a methacrylic ester. It is possible that the unsaturated ester is formed as a result of the dehydration of a part of the alpha-hydroxy ester in the course of the reaction. While, according to the conditions specified in my copending application there is formed a proportion of the alpha-hydroxy-iso-butyric ester along with the methacrylic ester, it is found that when the initial product of reaction between the acetone cyanohydrin and the sulfuric acid is further heated before the introduction of the alcohol, as is specified in my copending application, the yield of the methacrylic ester is increased, and this in fact takes place at least to some extent at the expense of the alpha-hydroxyisobutyric ester by-product.

Insofar as the present invention relates to the reactions between acetone cyanohydrin, sulfuric acid and alcohol, it is the object of the present invention to increase the yield of alpha-hydroxyisobutyric ester formed, and the conditions conducive to an increase in the yield of methacrylic ester at the expense of alpha-hydroxyisobutyric ester are, therefore, avoided so far as possible.

When the product of reaction between the ketonic cyanohydrin and sulfuric acid is heated with an alcohol and the reaction mixture is distilled, the alpha-hydroxy fatty ester and the corresponding unsaturated ester are usually not the only products formed. Carbon monoxide and the ketone usually make their appearance, representing a wasteful side reaction which is probably the decomposition of the alpha-hydroxy ester or the corresponding acid into the carbon monoxide, the ketone, alcohol, or water as the case may be. Charring also occurs, which must naturally diminish the yield of useful products obtained.

I believe that according to the present invention the increase in yield of alpha-hydroxy ester is partly due to the suppression of the side reactions leading to these wasteful by-products.

According to my invention a ketonic cyanohydrin and sulfuric acid are caused to react at a temperature not exceeding about 100° C., and the product, which is preferably not subjected to a further intermediate period of heating after the reaction has taken place, is heated with an alcohol until esterification has taken place. There is added to the esterified reaction mixture, either at this stage or in the early stages of distillation, a proportion of an anhydrous alkali metal sulfate or bisulfate, or of ammonium sulfate, and the mixture is then distilled.

In order to secure satisfactory conversion of the ketonic cyanohydrin into the esters, the proportion of sulfuric acid should be at least 1 mol for every mol of the ketonic cyanohydrin, but if much more than 1 mol is used the yield of the unsaturated ester tends to increase at the expense of the yield of the hydroxy ester and the maximum proportion of sulfuric acid desirable is about 1.3 mols for every mol of ketonic cyanohydrin. The proportion of alkali metal sulfate or ammonium sulfate used influences the ratio of the yield of alpha hydroxy ester to unsaturated ester in the sense that when the same proportion of sulfuric acid to ketonic cyanohydrin is used, up to a certain point the greater the proportion of the alkali metal sulfate or bisulfate or ammonium sulfate the greater the proportion of the alpha hydroxy ester produced as compared with the unsaturated ester. When 1 to 1.3 mols of sulfuric acid have been used for every mol of ketonic cyanohydrin the optimum amount of sodium sulfate is about 25–30% of the weight of the sulfuric acid, no appreciable improvement being obtained by using 35% as compared with 25–30%. The use of the excessive quantities is deleterious.

The distillate may be worked up by fractional distillation, whereby the separation of the ester fraction into the two constituents may be effected, or if desired the alpha hydroxy ester may be washed out of the distillate with water, whereupon aqueous solutions of the hydroxy ester may be made neutral if required and may then be distilled and the condensate may then be dried over an appropriate drying agent such as potassium carbonate, and redistilled.

In the case of the methyl ester of alpha-hydroxyisobutyric acid, the operations of reacting the cyanohydrin with sulfuric acid and heating the product with methyl alcohol may be carried out as indicated in my copending application, an appropriate quantity of metal sulfate being added before the mixture is distilled. The alpha hydroxyisobutyric ester may then be recovered by either of the above methods, while the methyl methacrylate fraction, which is insoluble in water and is of lower boiling point than the alpha hydroxyisobutyric methyl ester, may be further purified and recovered in known manner.

In conducting these operations on the distillate and on the unsaturated ester obtained therefrom, it is often advantageous to have present in solution in the material a small quantity of an antipolymerization material (e. g. 0.1% of hydroquinone) and it is further of advantage, with a view to preventing loss of the unsaturated ester by polymerization, to dissolve or suspend in the original reaction mixture prior to distillation a small quantity of polymerization inhibitor (e. g. 0.1% of hydroquinone). This may be conveniently introduced at the very start; that is to say into the ketonic cyanohydrin before it is caused to react with the other reagents. The alkali metal sulfate or bisulfate or ammonium sulfate may be introduced immediately after the alcohol has been heated with the reaction product from the cyanohydrin and the sulfuric acid.

The invention is illustrated by the following examples in which the parts are parts by weight.

*Example 1.*—850 parts by weight of crude acetone cyanohydrin, containing 799 parts of the pure substance, were added to 1200 parts of 98% sulfuric acid, with mechanical stirring and cooling at 75° C. Following addition of the cyanohydrin, methyl alcohol (600 parts) was added, with 1 part of hydroquinone, and the mixture was warmed on a water bath for 16 hours. To the product 300 parts of anhydrous sodium sulfate, preferably powdered, were added and the mixture was distilled, with mechanical agitation, until the temperature of the residue in the flask, reached 225° C. The vapors passing over were condensed, and after condensation passed through a spray trap to a receiver containing 1-2 parts of hydroquinone. 1012 parts of distillate were collected in this way.

The distillate was then fractionated in a 6 foot column packed with rings, giving a sharp separation of the constituents of the original distillate into: 177 parts, boiling up to 73°, and consisting essentially of acetone; 68 parts, boiling from 73° to 98°, and comprising mainly of a binary mixture of water and methyl methacrylate, from which the insoluble ester (42 parts) was removed by mechanical separation; 176 parts of nearly pure methyl methacrylate, from 98°–105°; and a residue of methyl alpha-hydroxy isobutyrate, 545 parts.

*Example 2.*—950 parts of acetone cyanohydrin, containing 799 parts of the pure substance, were mixed with 940 parts of 98% sulfuric acid, the cyanohydrin being run slowly into the well-cooled and mechanically agitated acid at 80° C.

On completion of addition of the cyanohydrin, 600 parts of methyl alcohol were added, and the mixture warmed 15 hours on the water bath. 300 parts of anhydrous sodium sulfate were then added and the mixture distilled until the temperature of the residue was 240°. The vapors were condensed, with use of a spray arrester, 1015 parts of condensate being obtained. On fractionation (as detailed in Example 1) of this condensate, 175 parts of acetone, 33 parts of methyl methacrylate and 771 parts of methyl alpha-hydroxy-isobutyrate were obtained.

Various changes may be made in the method described without departing from the invention or sacrificing any of the advantages thereof.

I claim:

1. An improved process for the production of alphahydroxy fatty acid esters, which comprises the steps of causing chemical reaction to take place between an aliphatic ketonic cyanhydrin and sulfuric acid at a temperature not appreciably above 100° C., esterifying the product with an aliphatic alcohol, adding to the esterified product an anhydrous sulfate selected from the group consisting of an alkali metal sulfate, an alkali metal bisulfate, and an ammonium sulfate, withdrawing the volatile products by distillation, and isolating the alphahydroxy fatty acid esters from the distillate.

2. A process as claimed in claim 1 in which the sulfate is an anhydrous alkali metal sulfate.

3. A process as claimed in claim 1 in which the sulfate is an anhydrous alkali metal bisulfate.

4. A process as claimed in claim 1 in which the sulfate is anhydrous sodium sulfate.

5. A process as claimed in claim 1 in which the proportion of sulfuric acid to the ketonic cyanhydrin is between 1 and 1.3 mols per mol.

6. A process as claimed in claim 1 characterized in that the sulfate used is sodium sulfate and its amount is from 25–30% by weight of the sulfuric acid employed.

7. A process as claimed in claim 1 wherein the ketonic cyanhydrin is acetone cyanhydrin and the alcohol is methanol.

8. In a process for the preparation of alpha-hydroxy isobutyric ester and methacrylic ester the steps which comprise reacting acetone cyanhydrin and sulfuric acid at a temperature not exceeding approximately 100° C., esterifying the reaction products with a lower aliphatic alcohol, adding to the esterified product an anhydrous sulfate selected from the group consisting of an alkali metal sulfate, an alkali metal bisulfate, and ammonium sulfate, withdrawing the volatile products by distillation, and isolating the alphahydroxy isobutyric ester from the distillate.

9. A process for the preparation of methyl methacrylate and methyl alpha-hydroxy isobutyrate which comprises reacting approximately 850 parts by weight of crude acetone cyanohydrin with approximately 1200 parts of 98% sulfuric acid while cooling the reaction mixture with stirring at 75° C., adding approximately 600 parts of methyl alcohol with 1 part of hydroquinone, warming on a water bath for approximately 16 hours, adding approximately 300 parts of anhydrous sodium sulfate to the reaction product, distilling the product until a temperature of the residue has reached approximately 225° C., and finally fractionating the distillate obtained to produce methyl methacrylate and methyl alpha-hydroxy isobutyrate.

JOHN WILLIAM CROOM CRAWFORD.